(12) United States Patent
Kumar

(10) Patent No.: US 8,453,379 B1
(45) Date of Patent: Jun. 4, 2013

(54) MULTI-FUNCTIONAL FURNITURE/ACCESSORY SYSTEM

(76) Inventor: Sivathanu B. Kumar, Tampa, FL (US)

( * ) Notice: Subject to any disclaimer, the term of this patent is extended or adjusted under 35 U.S.C. 154(b) by 351 days.

(21) Appl. No.: 12/928,975

(22) Filed: Dec. 23, 2010

Related U.S. Application Data

(60) Provisional application No. 61/398,613, filed on Jun. 29, 2010.

(51) Int. Cl.
*A01G 9/02* (2006.01)

(52) U.S. Cl.
USPC ........................... 47/66.6; 47/39; 47/86

(58) Field of Classification Search
USPC ............................... 47/39, 66.6, 86
See application file for complete search history.

(56) References Cited

U.S. PATENT DOCUMENTS

| | | | | |
|---|---|---|---|---|
| 127,243 A | * | 5/1872 | Johnson | 40/407 |
| 1,808,402 A | * | 6/1931 | Cooper | 47/39 |
| 1,820,843 A | * | 8/1931 | Spitz | 47/39 |
| 2,326,414 A | * | 8/1943 | Thompson | 220/4.27 |
| 3,485,408 A | * | 12/1969 | Benesch | 220/4.26 |
| D241,485 S | * | 9/1976 | Blodee | D6/336 |
| 6,446,387 B1 | * | 9/2002 | Simms | 47/66.6 |
| 2008/0157641 A1 | * | 7/2008 | Grout | 312/280 |
| 2009/0025289 A1 | * | 1/2009 | Krieg | 47/66.6 |
| 2012/0174481 A1 | * | 7/2012 | Toro | 47/86 |

FOREIGN PATENT DOCUMENTS

JP 2001252143 A * 9/2001

\* cited by examiner

*Primary Examiner* — Frank T Palo

(57) ABSTRACT

A central housing is provided in a generally rectilinear configuration. The central housing has a horizontal open top, a horizontal open bottom and side walls. A horizontal divider panel is provided between the top and the bottom. A plurality of interchangeable upper components is chosen from the class of upper components. The class of upper components include a cover, a seat, a small planter and a large planter. The upper components are adapted to be selectively positioned on the open top and depend into the upper component. A plurality of lower components is chosen from the class of lower components. The class of lower components includes a base and casters. The base is adapted to receive and support the bottom of the housing. A lateral opening in the housing is provided adjacent to the bottom for storage of selected upper components.

10 Claims, 4 Drawing Sheets

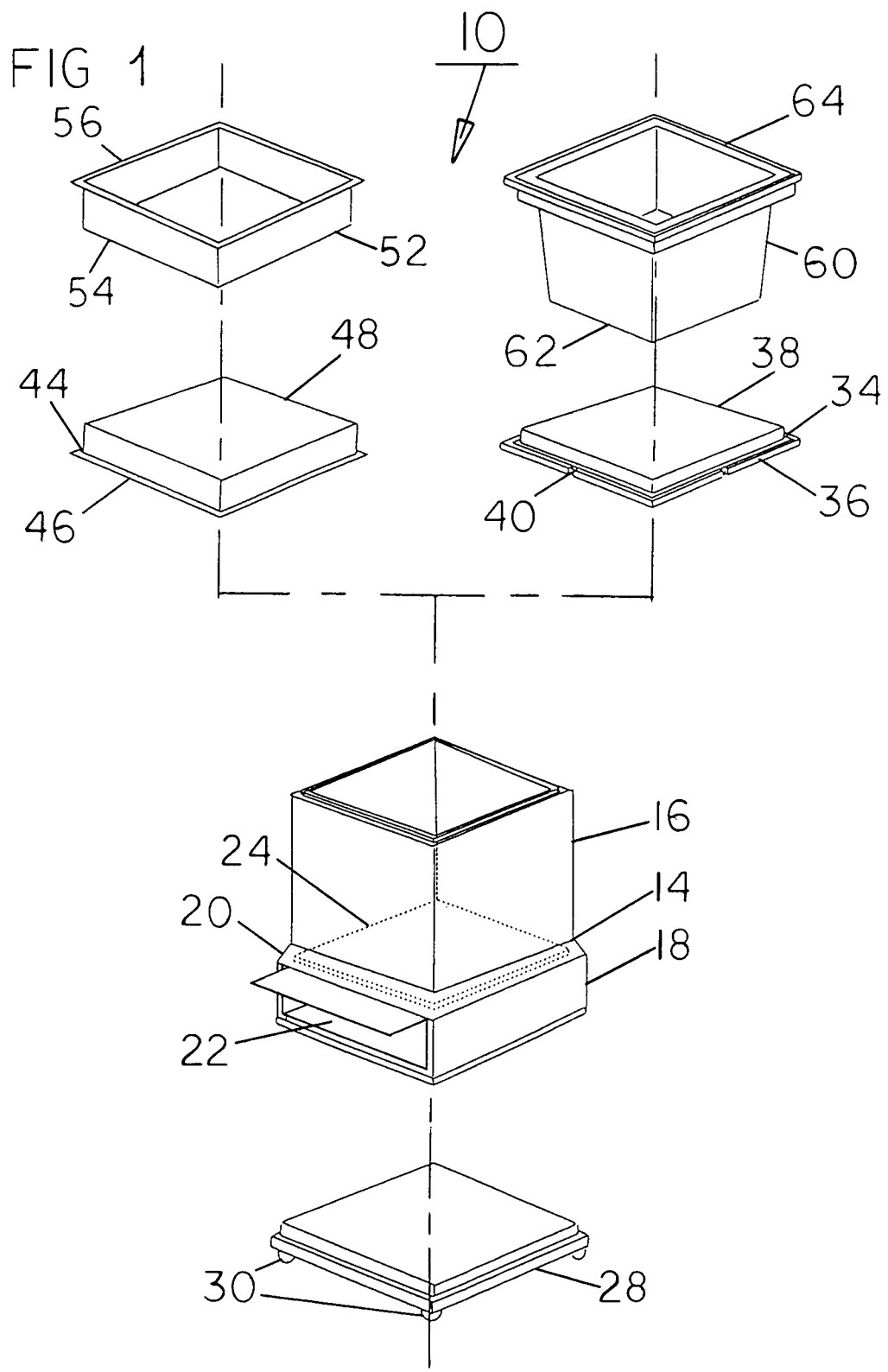

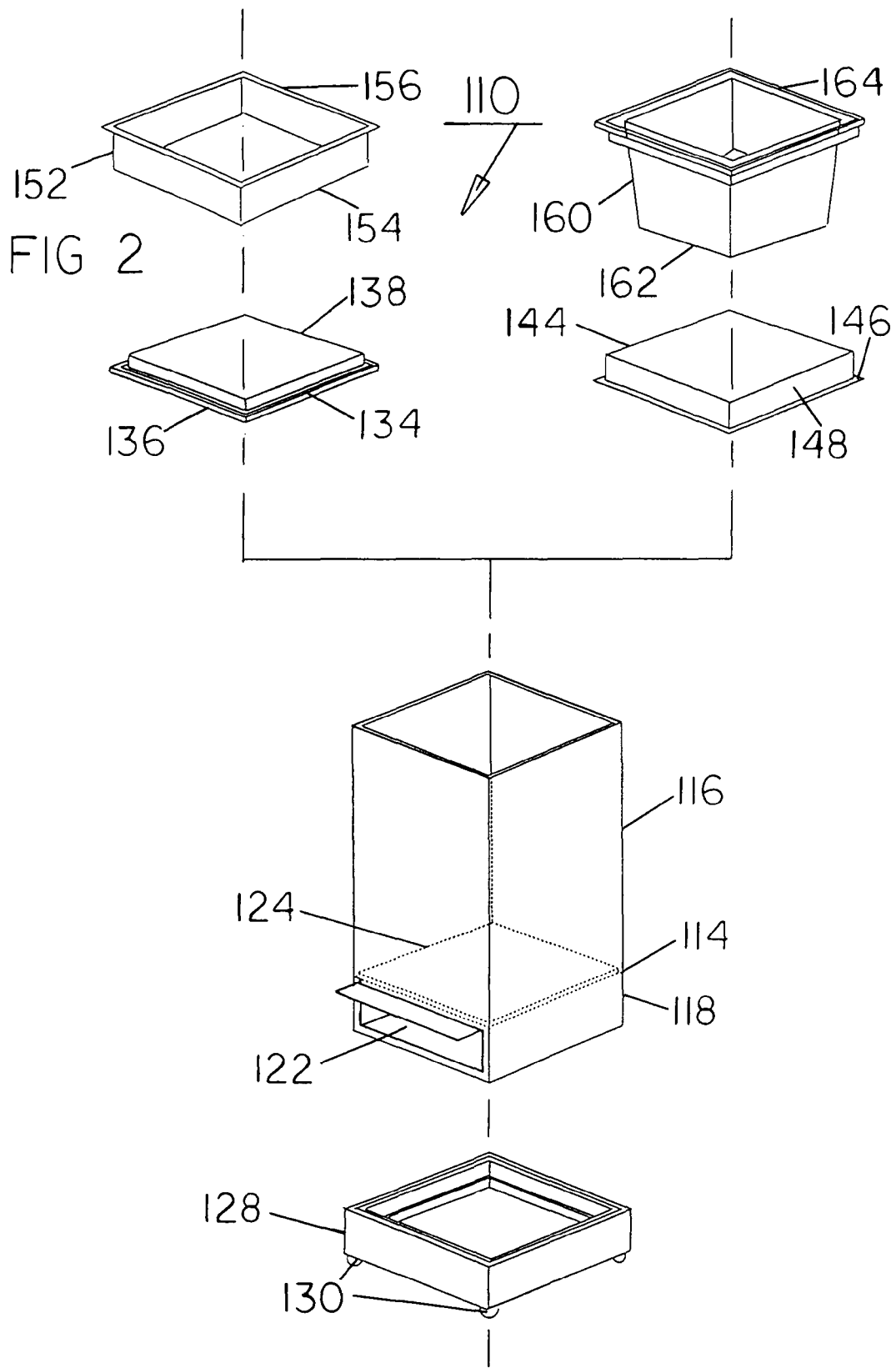

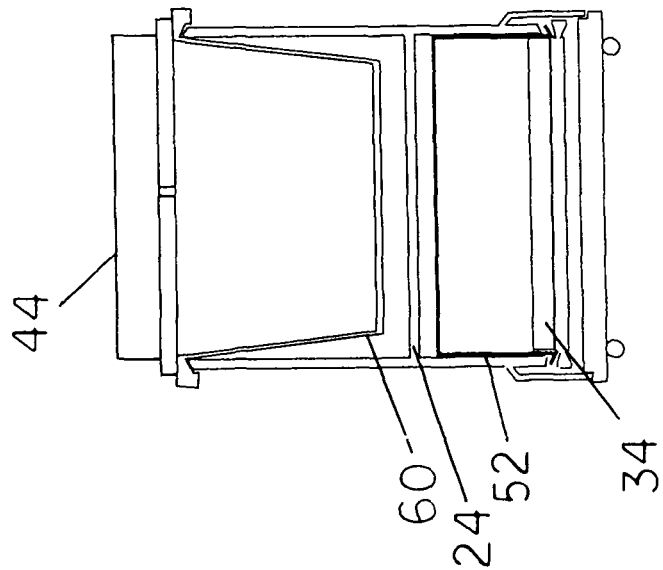
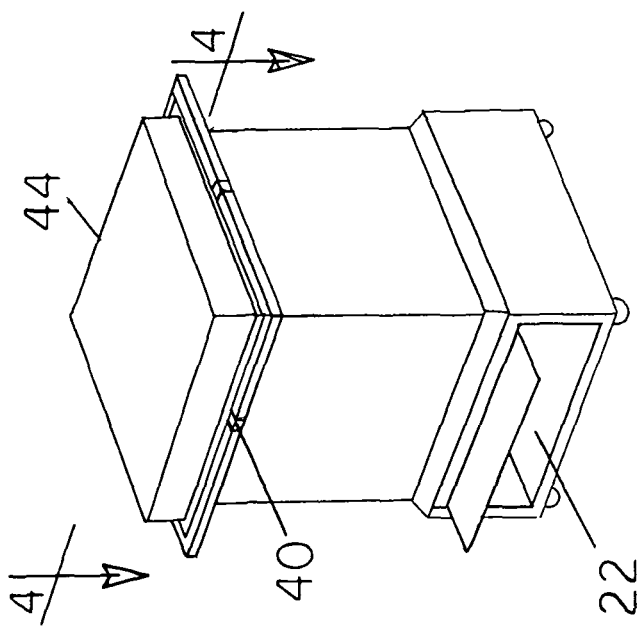

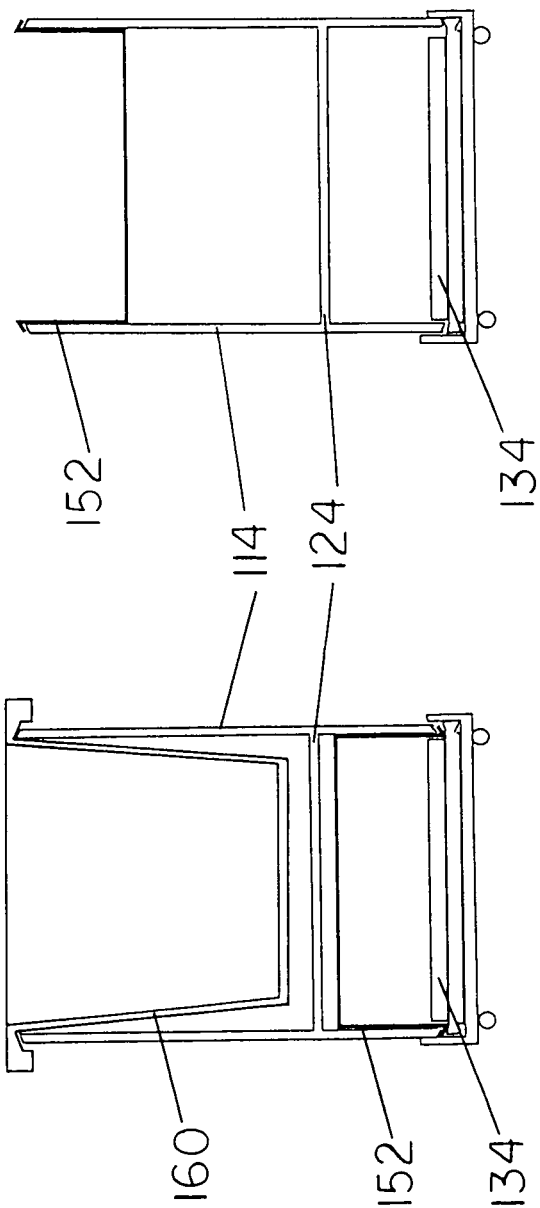

MULTI-FUNCTIONAL FURNITURE/ACCESSORY SYSTEM

RELATED APPLICATION

This application is based upon Provisional Application Ser. No. 61/398,613 filed Jun. 29, 2010 the subject matter of which is incorporated herein by reference.

FIELD OF THE INVENTION

The present invention relates to a multi-functional furniture/accessory system and more particularly pertains to outdoor use and adapted to be reconfigured for a variety of capabilities and configurations, the reconfiguring being done in a safe, convenient, eye-appealing and economical manner.

SUMMARY OF THE INVENTION

In view of the foregoing disadvantages inherent in the known types of furniture systems of known designs and configurations now present in the prior art, the present invention provides an improved multi-functional furniture/accessory system. As such, the general purpose of the present invention, which will be described subsequently in greater detail, is to provide a new and improved multi-functional furniture/accessory system and method which has all the advantages of the prior art and none of the disadvantages.

To attain this, the present invention essentially comprises a multi-functional furniture/accessory system. First provided is an upper component. The upper component has a central housing. The central housing is formed in a generally rectilinear configuration. The central housing has an upper extent. The upper extent is provided in a square cross sectional configuration. The upper extent is of a first peripheral size. The central housing has a lower extent. The lower extent is provided in a square cross sectional configuration. The lower extent is of a second peripheral size. The central housing has a horizontal open top. The central housing has a horizontal open bottom. The second size is greater than the first size. The central housing further includes an intermediate extent. The intermediate extent has four trapezoidal panels. In this manner the upper and lower extents are coupled. The central housing further includes a slot. The slot is formed in the lower extent. In this manner the passage of components into the lower chamber of the central housing for storage purposes is allowed. Further in this manner the passage of components from the central housing for utilization purposes is allowed. The central housing has a horizontal divide panel. The divide panel is provided between the top and the bottom. In this manner an upper chamber and a lower chamber are provided.

A lower component has a base. The base has four corner casters. The casters depend from the base. The base has a periphery. The periphery of the base is essentially equal to the periphery of the lower extent. In this manner the base may be received by the lower extent of the central housing for transportation purposes.

A plurality of interchangeable upper components are provided. Each of the upper components has a square upper peripheral size. The peripheral size of each upper component is greater than the peripheral size of the open top of the central housing.

The upper components include a cover. The cover is provided in a generally rectilinear configuration. The cover has a lower section. The lower section is removably receivable within the top of the central housing. The cover has an enlarged thin upper resilient section. The upper resilient section is supported by the top. In this manner a covering is provided for the system. The cover has peripheral channels. The peripheral channels are provided in the periphery of the cover. In this manner rain water is directed away from the system. Further in this manner the system is maintained dry when exposed to rain.

The upper components include a seat. The seat is provided in a generally rectilinear configuration. The seat has a lower section. The seat is removably receivable within the top of the central housing. The seat has an enlarged thick upper resilient section. The upper resilient section is supported by the top. In this manner a seat is provided for a user of the system.

The upper components also include a small planter. The small planer is provided in a generally rectilinear configuration. The small planter has an lower section. The small planter is removably receivable within a minority of the extent of the upper chamber of the central housing. The small planer has a depth. In this manner the small planter receives and supports soil and foliage. The small planter has an enlarged upper section. The upper section is supported by the top.

The upper components further include a large planter. A large planter is provided in a generally rectilinear configuration. The large planter has an lower section. The lower section is removably receivable within a majority of the extent of the upper chamber of the central housing. The large planter has a depth. In this manner the large planer receives and supports soil and foliage. The large planter has an enlarged upper section. The upper section is supported by the top.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved multi-functional furniture/accessory system which has all of the advantages of the prior art furniture systems of known designs and configurations and none of the disadvantages.

It is another object of the present invention to provide a new and improved multi-functional furniture/accessory system which may be easily and efficiently manufactured and marketed.

It is further object of the present invention to provide a new and improved multi-functional furniture/accessory system which is of durable and reliable constructions.

An even further object of the present invention is to provide a new and improved multi-functional furniture/accessory system which is susceptible of a low cost of manufacture with regard to both materials and labor, and which accordingly is then susceptible of low prices of sale to the consuming public, thereby making such multi-functional furniture/accessory system economically available to the buying public.

Even still another object of the present invention is to provide a multi-functional furniture/accessory system for outdoor use and adapted to be reconfigured for a variety of capabilities and configurations, the reconfiguring being done in a safe, convenient, eye-appealing and economical manner.

Lastly, it is an object of the present invention to provide a new and improved multi-functional furniture/accessory system. A central housing is provided in a generally rectilinear configuration. The central housing has a horizontal open top, a horizontal open bottom and side walls. A horizontal divider panel is provided between the top and the bottom. A plurality of interchangeable upper components is chosen from the class of upper components. The class of upper components include a cover, a seat, a small planter and a large planter. The upper components are adapted to be selectively positioned on the open top and depend into the upper component. A plurality of lower components is chosen from the class of lower components. The class of lower components includes a base and casters. The base is adapted to receive and support the bottom of the housing. A lateral opening in the housing is provided adjacent to the bottom for storage of selected upper components.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an exploded perspective illustration of an outdoor multi-functional furniture/accessory system with a variety of capabilities and configurations, constructed in accordance with the principles of the present invention.

FIG. 2 is an exploded perspective illustration of an indoor multi-functional furniture/accessory system, constructed in accordance with an alternate embodiment of the present invention.

FIG. 3 is a perspective illustration of the system shown in FIG. 1 but in a non-exploded orientation.

FIG. 4 is a cross sectional view of the outdoor embodiment taken along line 4-4 of FIG. 3.

FIGS. 5 and 6 are cross sectional views similar to FIG. 4 but illustrating the indoor embodiment shown in FIG. 2.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved multi-functional furniture/accessory system embodying the principles and concepts of the present invention and generally designated by the reference numeral 10 will be described.

The present invention, the multi-functional furniture/accessory system 10 is comprised of a plurality of components. Such components in their broadest context include a central housing, a plurality of interchangeable upper components and a plurality of lower components. Such components are individually configured and correlated with respect to each other so as to attain the desired objective.

First provided is an upper component. The upper component has a central housing 14. The central housing is formed in a generally rectilinear configuration. The central housing has an upper extent 16. The upper extent is provided in a square cross sectional configuration. The upper extent is of a first peripheral size. The central housing has a lower extent 18. The lower extent is provided in a square cross sectional configuration. The lower extent is of a second peripheral size. The central housing has a horizontal open top. The central housing has a horizontal open bottom. The second size is greater than the first size. The central housing further includes an intermediate extent 20. The intermediate extent has four trapezoidal panels. In this manner the upper and lower extents are coupled. The central housing further includes a slot 22. The slot is formed in the lower extent. In this manner the passage of components into the lower chamber of the central housing for storage purposes is allowed. Further in this manner the passage of components from the central housing for utilization purposes is allowed. The central housing has a horizontal divide panel 24. The divide panel is provided between the top and the bottom. In this manner an upper chamber and a lower chamber are provided.

A lower component has a base 28. The base has four corner casters 30. The casters depend from the base. The base has a periphery. The periphery of the base is essentially equal to the periphery of the lower extent. In this manner the base may be received by the lower extent of the central housing for transportation purposes.

A plurality of interchangeable upper components are provided. Each of the upper components has a square upper peripheral size. The peripheral size of each upper component is greater than the peripheral size of the open top of the central housing.

The upper components include a cover 34. The cover is provided in a generally rectilinear configuration. The cover has a lower section 36. The lower section is removably receivable within the top of the central housing. The cover has an enlarged thin upper resilient section 38. The upper resilient section is supported by the top. In this manner a covering is provided for the system. The cover has peripheral channels 40. The peripheral channels are provided in the periphery of the cover. In this manner rain water is directed away from the system. Further in this manner the system is maintained dry when exposed to rain.

The upper components include a seat 44. The seat is provided in a generally rectilinear configuration. The seat has a lower section 46. The seat is removably receivable within the top of the central housing. The seat has an enlarged thick upper resilient section 48. The upper resilient section is supported by the top. In this manner a seat is provided for a user of the system.

The upper components also include a small planter 52. The small planer is provided in a generally rectilinear configuration. The small planter has an lower section 54. The small planter is removably receivable within a minority of the extent of the upper chamber of the central housing. The small planer has a depth. In this manner the small planter receives and supports soil and foliage. The small planter has an enlarged upper section 56. The upper section is supported by the top.

The upper components further include a large planter 60. A large planter is provided in a generally rectilinear configuration. The large planter has a lower section 62. The lower section is removably receivable within a majority of the extent of the upper chamber of the central housing. The large planter has a depth. In this manner the large planer receives and supports soil and foliage. The large planter has an enlarged upper section 64. The upper section is supported by the top.

An alternate embodiment of the invention is illustrated in FIG. 2. Such alternate embodiment is a multi-functional furniture/accessory system 110 principally for indoor use. It is adapted to be reconfigured for a variety of capabilities and configurations. The reconfiguring is done in a safe, convenient, eye-appealing and economical manner. The system comprises, in combination, an upper component formed of a central housing 114 formed in a generally rectilinear configuration having an upper extent 116 with a square cross sectional configuration of a first peripheral size and a lower extent 118 with a square cross sectional configuration of a second peripheral size. The central housing has a horizontal open top and a horizontal open bottom. The second size is essentially equal to the first size. The central housing further includes a slot 122 formed in the lower extent for the passage of components into the lower chamber of the central housing for storage purposes and for the passage of components from the central housing for utilization purposes. The central housing has a horizontal divide panel 124 between the top and the bottom thereby forming an upper chamber and a lower chamber.

A lower component is formed as a base 128 with four corner casters 130 depending from the base. The base has a periphery essentially equal to the periphery of the lower extent for being removably receives by the lower extent of the central housing for transportation purposes.

Also included is a plurality of interchangeable upper components. Each of the upper components has a square upper peripheral size greater than the peripheral size of the open top of the central housing.

The upper components includes a cover 134 in a generally rectilinear configuration having a lower section 136 removably receivable within the top of the central housing and with an enlarged thin upper resilient section 138 supported by the top and providing a covering for the system.

A seat 144 in a generally rectilinear configuration has a lower section 146 removably receivable within the top of the central housing. An enlarged thick upper resilient section 148 is supported by the top thereby providing a seat for a user of the system.

A small planter 152 in a generally rectilinear configuration has an lower section 154 removably receivable within a minority of the extent of the upper chamber of the central housing with a depth to receive and support soil and foliage. The small planter has an enlarged upper section 156 supported by the top.

A large planter 160 in a generally rectilinear configuration has a lower section 162 removably receivable within a majority of the extent of the upper chamber of the central housing with a depth to receive and support soil and foliage. The large planter has an enlarged upper section 164 supported by the top.

FIG. 4 is a cross sectional view of the outdoor embodiment taken along line 4-4 of FIG. 3. In such view, the large planter 60 is in operative position upon the upper section of the housing. All of the other upper components are capable of being stored in the lower component. The seat 44 in also positioned upon the large planter. The cover 34 is also positionable upon either planter while a planter is positioned upon the upper component.

FIGS. 5 and 6 are cross sectional views similar to FIG. 4 but illustrating the indoor embodiment shown in FIG. 2. In the FIG. 5 embodiment, the large planter 160 is operatively positioned upon the upper section of the housing while the small planter 152 is stored in an inverted orientation within the lower component. In the FIG. 6 embodiment, the small planter 152 is operatively positioned upon the upper section of the housing while the large planter 160 is stored remote from the housing.

In each of the embodiments, the various upper components are adapted to be used and/or stored upon the upper section of the housing and within the lower section of the housing in any of a wide variety of orientations and locations.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A multi-functional furniture/accessory system comprising:
    a central housing formed in a generally rectilinear configuration with a horizontal open top and a horizontal open bottom and with side walls, the central housing having a horizontal divider panel between the top and the bottom;
    a plurality of interchangeable upper components chosen from the class of upper components including a cover, a seat, a small planter and a large planter, the upper components adapted to be selectively positioned on the open top and depending into the upper component; and
    a plurality of lower components chosen from the class of lower components including a base and casters, the base adapted to receive and support the bottom of the housing, a lateral opening in the housing adjacent to the bottom for storage of selected upper components.

2. The system as set forth in claim 1 wherein the central housing has a common cross sectional configuration of a first size along the majority of its extent and a common cross sectional configuration of a second size, greater than the first size there beneath.

3. The system as set forth in claim 1 wherein the central housing has a common cross sectional configuration along its entire height.

4. The system as set forth in claim 1 wherein the cover is in a generally rectilinear configuration having a lower section removably receivable within the top of the central housing and with an enlarged thin upper resilient section supported by the top and providing a covering for the system.

5. The system as set forth in claim 4 and further including: peripheral channels formed in the periphery of the cover for directing rain water and liquids away from the system to maintain the system dry.

6. The system as set forth in claim 1 wherein the seat is in a generally rectilinear configuration having a lower section removably receivable within the top of the central housing and with an enlarged thick upper resilient section supported by the top and providing a seat for a user of the system.

7. The system as set forth in claim 1 wherein the small planter is in a generally rectilinear configuration having an lower section removably receivable within a minority of the extent of the upper chamber of the central housing, a depth to receive and support soil and foliage, the small planter having an enlarged upper section supported by the top.

8. The system as set forth in claim 1 wherein the large planter is in a generally rectilinear configuration having an lower section removably receivable within a majority of the extent of the upper chamber of the central housing, a depth to receive and support soil and foliage, the large planter having an enlarged upper section supported by the top.

9. A multi-functional furniture/accessory system principally for outdoor use and adapted to be reconfigured for a variety of capabilities and configurations, the reconfiguring being done in a safe, convenient, eye-appealing and economical manner, the system comprising, in combination:

an upper component formed of a central housing formed in a generally rectilinear configuration having an upper extent with a square cross sectional configuration of a first peripheral size and a lower extent with a square cross sectional configuration of a second peripheral size, the central housing having a horizontal open top and a horizontal open bottom, the second size being greater than the first size, the central housing further including an intermediate extent formed of four trapezoidal panels coupling the upper and lower extents, the central housing further including a slot formed in the lower extent for the passage of components into the lower chamber of the central housing for storage purposes and for the passage of components from the central housing for utilization purposes, the central housing having a horizontal divide panel between the top and the bottom thereby forming an upper chamber and a lower chamber;

a lower component formed as a base with four corner casters depending from the base, the base having a periphery essentially equal to the periphery of the lower extent for being removably receives by the lower extent of the central housing for transportation purposes; and a plurality of interchangeable upper components, each of the upper components having a square upper peripheral size greater than the peripheral size of the open top of the central housing, the upper components including;

a cover in a generally rectilinear configuration having a lower section removably receivable within the top of the central housing and with an enlarged thin upper resilient section supported by the top and providing a covering for the system, peripheral channels formed in the periphery of the cover for directing rain water away from the system to maintain the system dry when exposed to rain;

a seat in a generally rectilinear configuration having a lower section removably receivable within the top of the central housing and with an enlarged thick upper resilient section supported by the top and providing a seat for a user of the system;

a small planter in a generally rectilinear configuration having an lower section removably receivable within a minority of the extent of the upper chamber of the central housing with a depth to receive and support soil and foliage, the small planter having an enlarged upper section supported by the top; and a large planter in a generally rectilinear configuration having an lower section removably receivable within a majority of the extent of the upper chamber of the central housing with a depth to receive and support soil and foliage, the large planter having an enlarged upper section supported by the top.

10. A multi-functional furniture/accessory system principally for indoor use and adapted to be reconfigured for a variety of capabilities and configurations, the reconfiguring being done in a safe, convenient, eye-appealing and economical manner, the system comprising, in combination:

an upper component formed of a central housing formed in a generally rectilinear configuration having an upper extent with a square cross sectional configuration of a first peripheral size and a lower extent with a square cross sectional configuration of a second peripheral size, the central housing having a horizontal open top and a horizontal open bottom, the second size being essentially equal to the first size, the central housing further including a slot formed in the lower extent for the passage of components into the lower chamber of the central housing for storage purposes and for the passage of components from the central housing for utilization purposes, the central housing having a horizontal divide panel between the top and the bottom thereby forming an upper chamber and a lower chamber;

a lower component formed as a base with four corner casters depending from the base, the base having a periphery essentially equal to the periphery of the lower extent for being removably receives by the lower extent of the central housing for transportation purposes; and a plurality of interchangeable upper components, each of the upper components having a square upper peripheral size greater than the peripheral size of the open top of the central housing, the upper components including a cover in a generally rectilinear configuration having a lower section removably receivable within the top of the central housing and with an enlarged thin upper resilient section supported by the top and providing a covering for the system;

a seat in a generally rectilinear configuration having a lower section removably receivable within the top of the central housing and with an enlarged thick upper resilient section supported by the top and providing a seat for a user of the system;

a small planter in a generally rectilinear configuration having a lower section removably receivable within a minority of the extent of the upper chamber of the central housing with a depth to receive and support soil and foliage, the small planter having an enlarged upper section supported by the top; and a large planter in a generally rectilinear configuration having an lower section removably receivable within a majority of the extent of the upper chamber of the central housing with a depth to receive and support soil and foliage, the large planter having an enlarged upper section supported by the top.

* * * * *